March 7, 1933. W. S. TATUM 1,900,778
DROP FRAME BODY FOR TRAILERS
Filed July 27, 1931 3 Sheets-Sheet 1
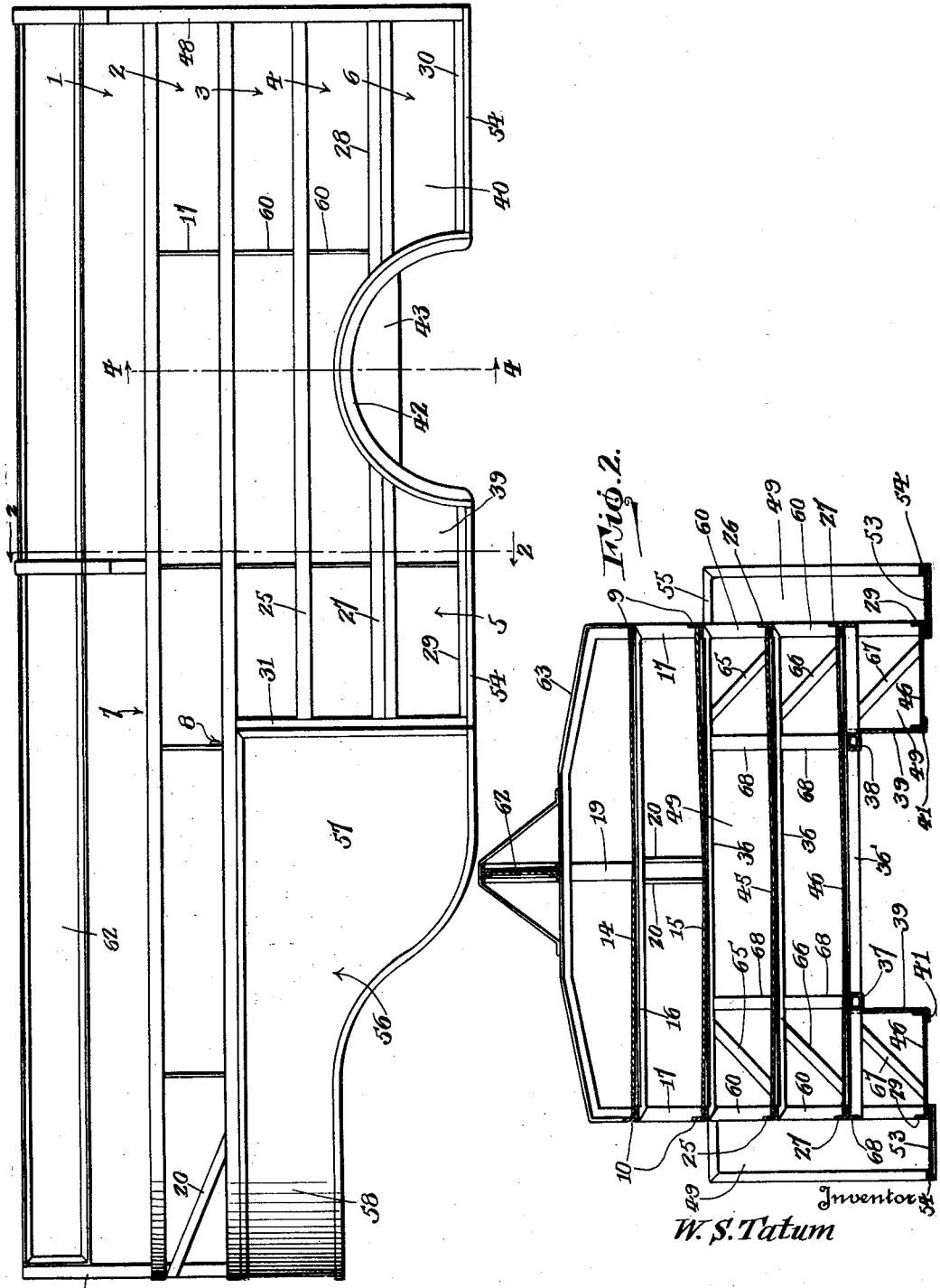

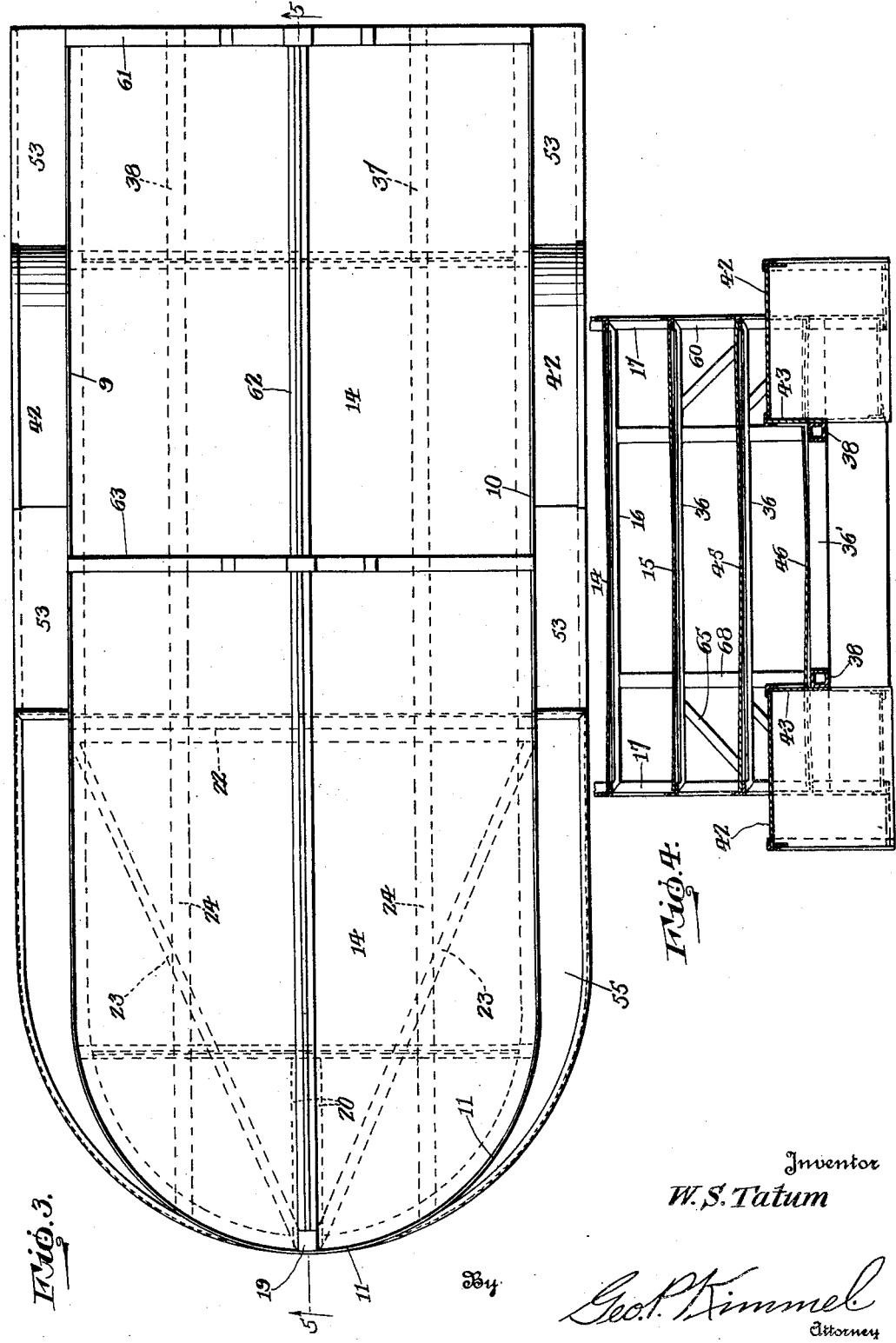

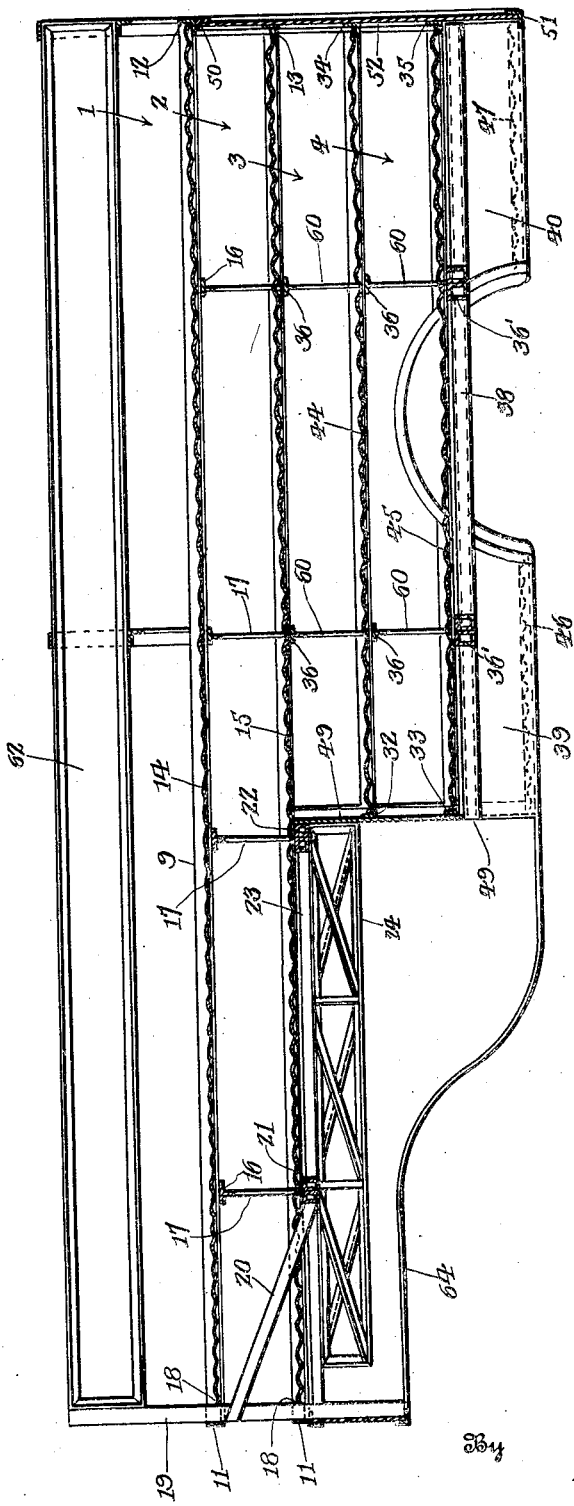

Patented Mar. 7, 1933

1,900,778

UNITED STATES PATENT OFFICE

WILL S. TATUM, OF HATTIESBURG, MISSISSIPPI

DROP FRAME BODY FOR TRAILERS

Application filed July 27, 1931. Serial No. 553,390.

This invention relates to a drop frame body of the plural deck type for trailers, and has for its object to provide, in a manner as hereinafter referred to a body of the class referred to so constructed and arranged to enable the body to be mounted upon the chassis of the trailer in very close proximity to the truck cab and to permit of the turning thereof in a very short radius.

A further object of the invention is to provide, in a manner as hereinafter set forth, a drop frame trailer body having its front end rounded on a radius substantially one-half of the body width and which not only lends to the body's appearance and attractiveness, but permits the body to be mounted on the trailer whereby the said rounded front can be positioned in very close proximity to the truck cab, far more so than a square body, as the latter could not turn on the short radius referred to.

A further object of the invention is to provide, in a manner as hereinafter set forth, a drop frame trailer body so constructed and arranged to fit in a thoroughly satisfactory manner upon a drop frame trailer.

A further object of the invention is to provide, in a manner as hereinafter set forth, a drop frame body for trailers provided with a plurality of decks extended rearwardly from the drop and one or more decks extending the full length thereof above the drop.

Further objects of the invention are to provide, in a manner as hereinafter set forth, a drop frame body of the plural deck type for trailers which is comparatively simple in its construction and arrangement, strong, durable, thoroughly efficient for the purpose intended, pleasing appearance, readily installed with respect to the chassis of the trailer, permitting of convenient access to the decks thereof, quickly assembled and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the invention as claimed.

In the drawings wherein like reference characters denote corresponding parts throughout the several views:—

Figure 1 is a side elevation of a drop frame body of the plural deck type for trailers and in accordance with this invention.

Figure 2 is a section on line 2—2 Figure 1.

Figure 3 is a top plan view of a drop frame body of the plural deck type in accordance with this invention.

Figure 4 is a section on line 4—4 Figure 1.

Figure 5 is a section on line 5—5 Figure 3.

The body, as illustrated includes a pair of superposed main decks 1, 2 extending from one end to the other end thereof, a plurality of superposed sub-decks 3, 4 and two pair of side decks. The decks of each pair of side decks are indicated at 5, 6. The pairs of side decks are arranged in opposed spaced relation. The side decks of each pair are spaced from each other. The sub-decks 3, 4 are arranged over the side decks and below the main decks.

The body is in the form of a main frame and a sub-frame. The decks 1, 2 are formed by the main frame and the decks 3, 4, 5 and 6 by the sub-frame, and the latter is arranged in dropped relation with respect to the main frame. The front end of each main deck is rounded and the rear end squared. The ends of the sub-decks 3, 4 are squared. The forward end of each side deck 5 is squared and the rear end of each side deck 6 is also squared.

The main frame includes a pair of superposed, aligning spaced rails 7, 8 of angle shaped cross section at any point throughout the length thereof to provide a horizontal and a vertical leg. Each of said rails consists of a pair of spaced, aligning side parts 9, 10 and a rounded front part 11. The ends of the rail 7 are connected together by a back rail 12. The ends of the rail 8 are connected together by a back rail 13. The rails 12, 13 are of the same cross sectional contour as the rails 7, 8. Secured upon the horizontal legs of the rails 7 and 12 is a corrugated flooring 14. Secured upon the horizontal legs of the rails 8, 13 is a corrugated flooring 15.

The horizontal legs of the parts 9, 10 of the rails 7 or 8 are connected together by transversely extending spaced T-braces 16 arranged below the floorings 14 or 15. Spaced vertically disposed braces 17 are secured to the horizontal legs of the side parts of the rail 8 and are connected at their upper ends to T-braces 16 which are secured to the horizontal legs of the side parts of the rail 7. The floorings 14, 15 at the front thereof are provided with aligning openings 18 through which extend a vertical front post 19 and the latter is secured to the rails 7, 8, extends above the deck 1, and depends below the deck 2. Secured to opposite sides of the post 19 directly below the front part 11 of rail 7 is a pair of rearwardly extending opposed, spaced, downwardly inclined braces 20 which extend through flooring 15 and are secured to a sill element 21 secured to the horizontal legs of the side parts of rail 8. Secured to the horizontal legs of the side parts 9, 10 of the rail 8, at a point between the transverse median and the front thereof is a sill element 22. Secured to opposite sides of the post 19 directly below the front part 11 of rail 8 is a pair of oppositely extending, inclined braces 23, which extend to and are secured to the sill element 22. Certain of the vertical braces align with the sills 21 and 22. Secured to braces 23, depending therefrom, disposed lengthwise with respect to the flooring 15 and arranged inwardly with respect to the side parts 9, 10 of the rail 8 is a pair of spaced, opposed truss frames 24 for supporting the front portion of the main frame upon the front part of the chassis of the truck of the trailer. The braces 23 and frames 24 are also secured to the T-braces 16 at the forward portion of deck 2.

The rails 7 and 12 and flooring 14 provide the deck 1. The rails 8 and 13 in connection with the flooring 15 provide the deck 2.

The sub-frame includes a pair of upper side rails 25, 26, two opposed pair of intermediate side rails and two opposed pair of lower side rails, and with the rails of each pair arranged in endwise opposed relation but spaced from each other. The rails of each pair of intermediate side rails are indicated at 27, 28 and the rails of each pair of lower side rails are indicated at 29, 30. Each of said rails is of angle shaped cross section to provide a vertical and a horizontal leg. Depending from the side parts 9, 10 of the rail 7 are vertically disposed, spaced, aligning front corner rails 31 of angle shaped cross section and which are attached to the forward ends of the rails 25, 26, 27 and 29. Secured to the rails 31 are superposed, front end rails 32, 33. The rear ends of the rails 25, 26 are connected together by a rear end rail 34 and secured to the rear ends of the rails 28 is a rear end rail 35. Attached to the rails 8, 25 and 26 are depending transversely extending T-braces 36. Secured to and extending from the rail 33 to the rail 35, as well as being secured to rail 35 is a pair of spaced, opposed, lengthwise extending sills 37, 38 arranged below the truss frames 24 and inwardly with respect to the ends of the rails 33, 35. The sills 37, 38 are employed for mounting the sub-frame upon the dropped portion of the chassis of the truck.

Depending from the outer side of the sill 37 and the sill 38 is a pair of spaced vertically disposed plates 39, 40 standing on a lengthwise edge and each formed in its bottom with an outwardly directed flange 41. Connected to the inner ends of the plates 39, 40, the rear ends of rails 25, 27, the forward ends of the rails 28, 30 are wheel fenders 42 formed with closures 43 for the upper portions thereof.

Secured upon the horizontal portions of the rails 25, 26, 32 and 34 is a corrugated flooring 44. Secured upon the horizontal portions of the rails 27, 28 and the rails 33, 34 is a corrugated flooring 45. Secured upon rails 29 and the flanges 41 of the plates 39 are floorings 46 of the corrugated type and secured upon the horizontal portions of the legs 30 and the flanges 41 of the plates 40 are corrugated floorings 47.

The deck 3 is provided by the rails 25, 26, 32 and 34 and the flooring 44. The deck 4 is provided by the rails 27, 28, 33 and 35 and the flooring 45. Each deck 5 is provided by a rail 29, a flanges 41 and the flooring 46. Each deck 6 is provided by a rail 30, a flange 41 and the flooring 47.

Common to the rear ends of the rails 7, 8, 25, 26, 28 and 30 are rear corner rails 48 which extend above the rails 7.

Positioned against the forward face of the rails 32, 33 and extending from the rail 8 to the rail 29 as well as being secured therewith and projecting laterally from the rails 31 is a closure plate 49 for the forward ends of the decks 3, 4 and 5. The plate 49 is secured against the rear sill 22, abuts the rail 8 and has the central part of its lower portion cut out, as at 49' to provide a clearance for the sills 37, 38 and for mounting of the sub-frame upon the dropped portion of the chassis of the truck.

Attached to and depending from the rail 12 is a rail 50 and secured to the rear corner rails 48 at the lower ends thereof is a rail 51. Secured to the inner face of the rail 50 and to the outer faces of the rails 13, 34 and 35 and also secured to the forward face of the rail 51 is a closure plate 52 for the rear ends of the decks 2, 3, 4 and 5.

Attached to the rail 51, the rails 29, 30 and the front and rear end of the fenders 42 are foot treads 53 which are also secured to angle bars 54 which are attached to the plate 49, rails 51 and fenders 42. Secured to the rail 8 and projecting laterally from each side and the front thereof is a closure member 55 which extends from one end to the other end of plate 49 and completely around the front of the rail 8. The closure member 55 is disposed at right angles with respect to the rail 8. Connected to the member 55 and also to the ends of the plate 49 is a vertically disposed closure member 56 having its forward part 57 of less height than its rear part 58, the former being arranged at the forward portion of the main frame. The closure member 56 conforms in contour to the forward portion of the main frame and conceals the truss frames 24 as well as depending below the latter. The decks 3, 4 are provided with vertical braces 60. The vertical braces 60 of the deck 3 are secured at their upper ends of the T-braces 36 attached to the rail 8 and at their lower ends to the horizontal legs of the rails 25, 26. The vertical braces 60 of the deck 4 are secured at their upper ends to the T-braces 36 attached to the rails 25, 26 and at their lower ends to the horizontal legs of the rails 27, 28. Secured to the horizontal legs of the rails 27, 28 are transverse sill elements 36' arranged in alignment with the lower ends of the vertical braces 60 of the deck 4.

The lower corner rails 48 terminate in a substantially arc shaped rear support 61 for a sign 60. Extending upwardly from the deck 1, at the transverse center thereof is an arc shaped support 63 for the sign 62 and the latter at its forward end is connected to the upper end of the post 19.

The center of the part 58 of the closure 57 is attached to the lower portion of the post 19. Secured to the closure member 56 is a bottom plate 64 which is arranged against the edge of the member 58 throughout.

Truss braces 65 are interposed between the decks 2 and 3 at the front end of the latter, truss braces 66 are interposed between decks 3 and 4 at the front end of the latter and truss braces 67 are interposed between deck 4 and decks 5 at the front of the latter. The braces are arranged in proximity to the plate 49. Vertical braces 68 are arranged between decks 3 and 4 and 4 and 5 in proximity to plate 49.

What I claim is:—

1. A drop body for trailers comprising a main frame, a sub-frame disposed in dropped relation with respect to and of less length than said main frame and having its rear end flush with the rear end of the main frame, each of said frames provided with a plurality of superposed decks, spaced front and rear opposed transverse sills for the lowermost deck of the main frame and arranged forwardly of the uppermost deck of the sub-frame, truss frames secured to said sills, extending at right angles to the latter, spaced outwardly from the sides of the main frame and arranged forwardly of the sub-frame.

2. A drop body for trailers comprising a rectangular main frame, a rectangular sub-frame disposed in dropped relation with respect to and of less length than said main frame and having its rear end flush with the rear end of the main frame, and each of said frames formed with a plurality of superposed decks, spaced front and rear opposed transverse sills for the lowermost deck of the main frame and arranged forwardly of the uppermost deck of the sub-frame, truss frames secured to said sills, extending at right angles to the latter, spaced inwardly from the sides of the main frame and arranged forwardly of the sub-frame, and oppositely inclined braces extending from the center of the forward end of the lowermost deck of the main frame, connected to said sills and truss frames and terminating at said rear sill.

3. A drop body for trailers comprising a main frame having means forming superposed decks extending lengthwise and opening at the sides thereof, and a sub-frame disposed in dropped relation with respect to and of less length than said main frame, said main frame projecting forwardly at right angles with respect to the forward end of the top of the sub-frame, said sub-frame having means forming superposed upper decks extending lengthwise and opening at the sides thereof and two pair of side decks arranged below the lower end of said upper decks, spaced front and opposed transverse sills for the lowermost deck of the sub-frame, a vertical plate secured to said rear sill and to the sub-frame for closing the forward ends of and projecting laterally in opposite directions from the decks of the latter, a flat semi-oval shaped closure member disposed at right angles to the forward portion of the bottom of the sides of the main frame, extending around the front of the latter and having its ends secured to the top of the lateral projected portion of said plate, and a vertical closure member having its ends secured to the ends of said plate, of a contour corresponding to said flat member and having its top secured throughout to the latter.

4. A drop body for trailers comprising a main frame of the deck type and a sub-frame of the deck type, said sub-frame disposed in dropped relation with respect to and of less length than said main frame, said main frame projecting forwardly at right angles to the front of the sub-frame and having its front rounded, and foot treads projecting laterally from each side of the bottom of the sub-frame.

5. A drop body for trailers comprising a main frame, a sub-frame disposed in dropped relation with respect to and of less length than said main frame and having its rear end flush with the rear end of the main frame, each of said frames provided with a plurality of superposed decks, spaced front and rear sills for the lowermost deck of the main frame and arranged forwardly of the uppermost deck of the sub-frame, said main frame including a vertical post centrally of the front of the decks thereof, and a pair of rearwardly extending, opposed, downwardly inclined braces secured to said post above the lower end thereof, passing through the bottom of said lowermost deck and secured to said front sill.

6. A drop body for trailers comprising, a main frame of the plural deck type, a sub-frame of the plural deck type disposed in dropped relation with respect to and of less length than said main frame, the latter extending forwardly with respect to the top of the front of the sub-frame, foot treads arranged below and extended laterally with respect to the sides of the lowermost deck of the sub-frame, spaced, opposed truss frames secured to and depending from the main frame inwardly of the sides of the latter and forwardly of the sub-frame, spaced sills for the bottom of the sub-frame and spaced sills for the bottom of the main frame arranged forwardly of the sub-frame.

7. A drop body for trailers comprising, a main frame of the plural deck type, a sub-frame of the plural deck type disposed in dropped relation with respect to and of less length than said main frame, the latter extending forwardly with respect to the top of the front of the sub-frame, foot treads arranged below and extended laterally with respect to the sides of the lowermost deck of the sub-frame, spaced, opposed truss frames secured to and depending from the main frame inwardly of the sides of the latter and forwardly of the sub-frame, spaced sills for the bottom of the sub-frame and spaced sills for the bottom of the main frame arranged forwardly of the sub-frame, and inclined braces depending from the bottom of the main frame and connected to the sills for the latter and to said truss frames.

8. A drop body for trailers comprising, a main frame of the plural deck type, a sub-frame of the plural deck type disposed in dropped relation with respect to and of less length than said main frame, the latter extending forwardly with respect to the top of the front of the sub-frame, foot treads arranged below and extending laterally with respect to the sides of the lowermost deck of the sub-frame, spaced, opposed truss frames secured to and depending from the main frame inwardly of the sides of the latter and forwardly of the sub-frame, spaced sills for the bottom of the sub-frame and spaced sills for the bottom of the main frame arranged forwardly of the sub-frame, inclined braces depending from the bottom of the main frame and connected to the sills for the latter and to said truss frames, and means secured to and depending from the bottom of the main frame, extended laterally with respect to the forward part of the sides of the latter, arranged forwardly of and secured at its rear to the front of the sub-frame for concealing the said sills and braces of the main frame.

In testimony whereof, I affix my signature hereto.

WILL S. TATUM.